US012482911B2

(12) United States Patent
Cui et al.

(10) Patent No.: US 12,482,911 B2
(45) Date of Patent: Nov. 25, 2025

(54) PHASE SHIFTER HAVING FIRST AND SECOND SUBSTRATES WITH A TUNABLE DIELECTRIC LAYER AND ISOLATION COMPONENTS DISPOSED THEREBETWEEN

(71) Applicant: BOE Technology Group Co., Ltd., Beijing (CN)

(72) Inventors: Zhao Cui, Beijing (CN); Feng Zhang, Beijing (CN); Liwen Dong, Beijing (CN); Dongfei Hou, Beijing (CN); Yuqiao Li, Beijing (CN); Wenqu Liu, Beijing (CN); Zhijun Lv, Beijing (CN); Detian Meng, Beijing (CN); Qi Yao, Beijing (CN); Liuqing Li, Beijing (CN); Yong Ma, Beijing (CN); Mengya Song, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/028,012

(22) PCT Filed: Apr. 26, 2022

(86) PCT No.: PCT/CN2022/089214
§ 371 (c)(1),
(2) Date: Mar. 23, 2023

(87) PCT Pub. No.: WO2023/206059
PCT Pub. Date: Nov. 2, 2023

(65) Prior Publication Data
US 2024/0297426 A1 Sep. 5, 2024

(51) Int. Cl.
*H01P 1/18* (2006.01)
*H01Q 3/36* (2006.01)

(52) U.S. Cl.
CPC ................ *H01P 1/181* (2013.01); *H01P 1/18* (2013.01); *H01Q 3/36* (2013.01)

(58) Field of Classification Search
CPC ....................................................... H01P 1/181
(Continued)

(56) References Cited

U.S. PATENT DOCUMENTS

| | | | | |
|---|---|---|---|---|
| 5,274,391 | A | 12/1993 | Connolly | |
| 2015/0380789 | A1 * | 12/2015 | Jakoby et al. | H01P 1/184 343/905 |
| 2020/0203827 | A1 * | 6/2020 | Wang et al. | H01P 1/181 |

FOREIGN PATENT DOCUMENTS

| | | | |
|---|---|---|---|
| CN | 108710232 | A | 10/2018 |
| CN | 108803096 | A | 11/2018 |

(Continued)

*Primary Examiner* — Benny T Lee
(74) *Attorney, Agent, or Firm* — Nath, Goldberg & Meyer; Joshua B. Goldberg

(57) ABSTRACT

A phase shifter, a manufacturing method thereof and an electronic device are provided. The phase shifter includes opposite first and second substrates, and a tunable dielectric layer and first isolation components therebetween. The first substrate includes a first dielectric substrate and a first electrode on a side of the first dielectric substrate close to the tunable dielectric layer; the second substrate includes a second dielectric substrate and a second electrode on a side of the second dielectric substrate close to the tunable dielectric layer; the phase shifter includes a phase shift region and a peripheral region; the phase shift region includes overlapping regions; the first electrode and the second electrode are both in the phase shift region, and orthographic projections of the first electrode and the second electrode on the first dielectric substrate at least partly overlap with each other in the overlapping regions, to form overlapping capacitors.

20 Claims, 7 Drawing Sheets

(58) Field of Classification Search
USPC .......................................................... 333/161
See application file for complete search history.

(56) References Cited

FOREIGN PATENT DOCUMENTS

| | | | |
|---|---|---|---|
| CN | 110649356 | A | 1/2020 |
| CN | 112397854 | A | 2/2021 |
| CN | 112768851 | A | 5/2021 |

* cited by examiner

PHASE SHIFTER HAVING FIRST AND SECOND SUBSTRATES WITH A TUNABLE DIELECTRIC LAYER AND ISOLATION COMPONENTS DISPOSED THEREBETWEEN

This is a National Phase Application filed under 35 U.S.C. 371 as a national stage of PCT/CN2022/089214, filed Apr. 26, 2022, the content of which is hereby incorporated by reference in its entirety.

TECHNICAL FIELD

The present disclosure relates to the field of communication technology, and in particular to a phase shifter, a manufacturing method for a phase shifter and an electronic device.

BACKGROUND

In an existing liquid crystal phase shifter, periodic patch capacitors are introduced on an assembled upper glass substrate, and a variable capacitor is used to adjust a voltage difference loaded on opposite surfaces of two metal plates to drive liquid crystal molecules to rotate, so as to obtain different characteristics of the liquid crystal material, and a corresponding capacitance value is accordingly variable, so that a phase of a fed-in microwave signal is adjusted.

SUMMARY

The present disclosure is directed to at least one of the technical problems in the prior art, and provides a phase shifter, a method for manufacturing the same, and an electronic device.

In a first aspect, an embodiment of the present disclosure provides a phase shifter, including a first substrate and a second substrate opposite to each other, and a tunable dielectric layer between the first substrate and the second substrate; wherein the first substrate includes a first dielectric substrate and a first electrode on a side of the first dielectric substrate close to the tunable dielectric layer; the second substrate includes a second dielectric substrate and a second electrode on a side of the second dielectric substrate close to the tunable dielectric layer; the phase shifter includes a phase shift region and a peripheral region; the phase shift region includes a plurality of overlapping regions; the first electrode and the second electrode are both in the phase shift region, and orthographic projections of the first electrode and the second electrode on the first dielectric substrate at least partly overlap with each other in the plurality of overlapping regions, to form a plurality of overlapping capacitors; and the phase shifter further includes a plurality of first isolation components between the first substrate and the second substrate, two end faces of each first isolation component abut against the first substrate and the second substrate, respectively, and an orthographic projection of at least one overlapping capacitor on the first dielectric substrate is within an orthographic projection of the corresponding first isolation component on the first dielectric substrate.

In some embodiments, the first electrode includes a first transmission line and a second transmission line arranged side by side and extending along a transmission direction of a microwave signal; the second electrode includes a plurality of patch structures arranged side by side in the transmission direction of the microwave signal; orthographic projections of two ends of any patch structure on the first dielectric substrate at least partially overlap with orthographic projections of the first transmission line and the second transmission line on the first dielectric substrate, respectively, to form the corresponding overlapping capacitors in the corresponding overlapping regions.

In some embodiments, the first electrode includes a first transmission line extending along a transmission direction of the microwave signal, and a plurality of first branches connected to the first transmission line and arranged side by side along the transmission direction of the microwave signal; the second electrode includes a second transmission line extending along the transmission direction of the microwave signal, and a plurality of second branches connected to the second transmission line and arranged side by side along the transmission direction of the microwave signal; an orthographic projection of an end of each first branch away from the first transmission line on the first dielectric substrate and an orthographic projection of an end of the corresponding second branch away from the second transmission line on the first dielectric substrate at least partially overlap with each other, to form the corresponding overlapping capacitor in the corresponding overlapping region.

In some embodiments, the phase shifter further includes a second isolation component and a third isolation component between the first substrate and the second substrate and extending along the transmission direction of the microwave signal; and the first isolation components are in communication with both the second isolation component and the third isolation component; and an orthographic projection of the first transmission line on the first dielectric substrate is in an orthographic projection of the second isolation component on the first dielectric substrate; and an orthographic projection of the second transmission line on the first dielectric substrate is within an orthographic projection of the third isolation component on the first dielectric substrate In some embodiments, the phase shifter further includes spacers between the first substrate and the second substrate; wherein the spacers are in the peripheral region and the phase shift region.

In some embodiments, the first isolation components are made of the same material as the spacers.

In some embodiments, an arrangement density of the spacers in the peripheral region is greater than that of the spacers located in the phase shift region.

In some embodiments, a thickness of the first electrode and/or the second electrode is not less than 3 μm.

In some embodiments, the tunable dielectric layer includes a liquid crystal layer.

In a second aspect, an embodiment of the present disclosure provides a method of manufacturing a phase shifter, including: forming a first substrate and a second substrate, and aligning and assembling the first substrate and the second substrate, and forming a tunable dielectric layer therebetween in a filling way; wherein the phase shifter includes a phase shift region and a peripheral region, and the phase shift region includes a plurality of overlapping regions; the forming the first substrate includes: providing a first dielectric substrate, and forming a first electrode on the first dielectric substrate, wherein the first electrode is in the phase shift region; the forming the second substrate includes: providing a second dielectric substrate; and forming a second electrode on the second dielectric substrate; wherein orthographic projections of the first electrode and the second electrode in the plurality of overlapping regions at least partially overlap with each other, to form a plurality of overlapping capacitors; and the method further includes:

forming a plurality of first isolation components on the first substrate or the second substrate, wherein when the first substrate and the second substrate are aligned and assembled, two end faces of each first isolation component respectively abut against the first substrate and the second substrate; an orthographic projection of each overlapping capacitor on the first dielectric substrate is located in an orthographic projection of the corresponding first isolation component on the first dielectric substrate.

In some embodiments, the forming the first electrode on the first dielectric substrate, includes: forming a first metal film on the first dielectric substrate, and forming a first metal pattern as a first seed layer through a patterning process; and electroplating the first seed layer, and forming a pattern including the first electrode through a patterning process.

In some embodiments, the plurality of first isolation components are formed on the first substrate, and the plurality of first isolation components are formed after the forming the first seed layer and before the electroplating the first seed layer.

In some embodiments, the forming the second electrode on the second dielectric substrate, includes: forming a second metal film on the second dielectric substrate, and forming a second metal pattern as a second seed layer through a patterning process; and electroplating the second seed layer, and forming a pattern including the second electrode through a patterning process.

In some embodiments, the plurality of first isolation components are formed on the second substrate, and the plurality of first isolation components are formed after the forming the second seed layer and before the electroplating the second seed layer.

In a third aspect, an embodiment of the present disclosure provides an electronic device, which includes the phase shifter in any one of the above embodiments.

DETAIL DESCRIPTION OF EMBODIMENTS

In order to enable one of ordinary skill in the art to better understand the technical solutions of the embodiments of the present disclosure, the present invention will be described in further detail with reference to the accompanying drawings and the detailed description.

Unless defined otherwise, technical or scientific terms used herein shall have the ordinary meaning as understood by one of ordinary skill in the art to which the present disclosure belongs. The terms "first", "second", and the like used in the present disclosure are not intended to indicate any order, quantity, or importance, but rather are used for distinguishing one element from another. Further, the term "a", "an", "the", or the like used herein does not denote a limitation of quantity, but rather denotes the presence of at least one element. The term of "comprising", "including", or the like, means that the element or item preceding the term contains the element or item listed after the term and its equivalent, but does not exclude other elements or items. The term "connected", "coupled", or the like is not limited to physical or mechanical connections, but may include electrical connections, whether direct or indirect connections. The terms "upper", "lower", "left", "right", and the like are used only for indicating relative positional relationships, and when the absolute position of an object being described is changed, the relative positional relationships may also be changed accordingly.

Figure 1:
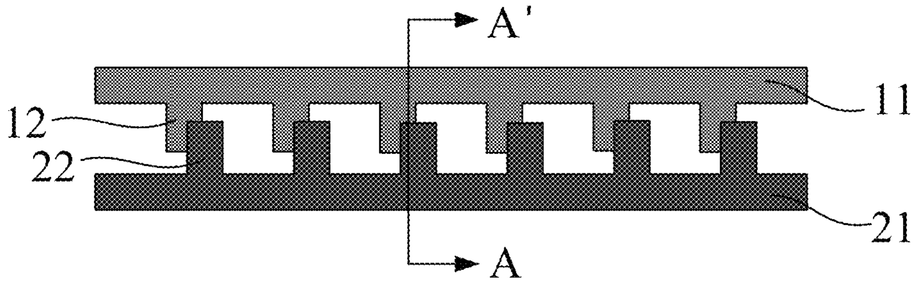
FIG. 1 is an exemplary phase shifter.
Figure 2:
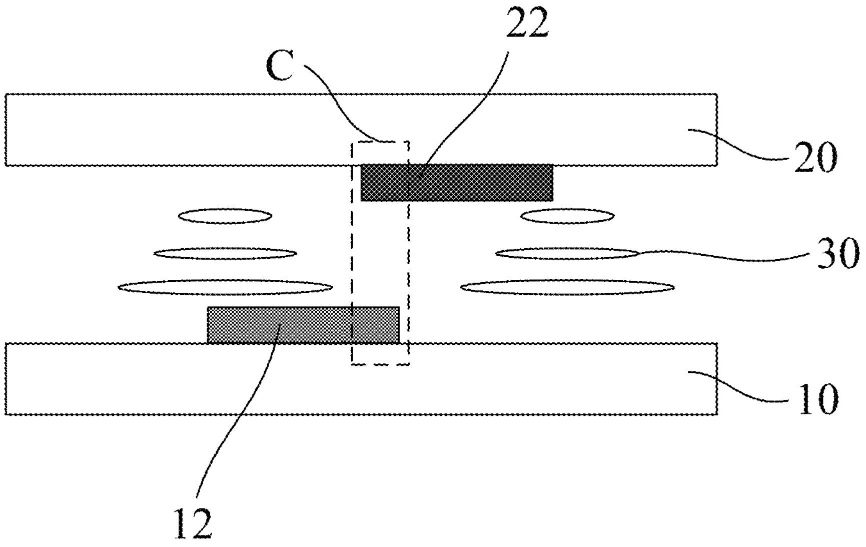
FIG. 2 is a cross-sectional view taken along a line A-A' of FIG. 1.

FIG. 1 is an exemplary phase shifter. FIG. 2 is a cross-sectional view taken along a line A-A' of FIG. 1. As shown in FIGS. 1 and 2, the phase shifter includes a first substrate and a second substrate disposed opposite to each other, and a liquid crystal layer 30 disposed between the first substrate and the second substrate. The first substrate includes a first dielectric substrate 10 and a first electrode 1 arranged on a side of the first dielectric substrate 10 close to the liquid crystal layer 30. The first electrode 1 includes a first transmission line 11 extending along a transmission direction of a microwave signal, and a plurality of first branches 12 connected to the first transmission line 11 and arranged side by side along the transmission direction of the microwave signal. The second electrode 2 includes a second transmission line 21 extending along the transmission direction of the microwave signal, and a plurality of second branches 22 connected to the second transmission line 21 and arranged side by side along the transmission direction of the microwave signal. An orthographic projection of an end of each first branch 12 away from the first transmission line 11 on the first dielectric substrate 10 and an orthographic projection of an end of the corresponding second branch 22 away from the second transmission line 21 on the first dielectric substrate 10 at least partially overlap with each other, to form an overlapping capacitor C in an overlapping region. For example: the first branches 12 are in one-to-one correspondence with the second branches 22, and orthographic projections of the first branch 12 and second branch 22 corresponding to each other on the first dielectric substrate 10 at least partially overlap with each other. In this case, a direct current bias voltage may be applied to the first transmission line 11 and the second transmission line 21, to control a dielectric constant of the liquid crystal layer 30, thereby adjusting a total capacitance per unit length, and thus achieving a phase shift effect of the microwave signals output from the first transmission line 11 and the second transmission line 21. The uniformity of thicknesses of the first transmission line 11, the second transmission line 21 and the liquid crystal layer 30 have a decisive influence on the performance of the phase shifter. However, since a liquid crystal material of the liquid crystal layer 30 has a certain fluidity, the flow and leakage of the liquid crystal material may be caused in the subsequent processes, such as in the process of aligning and assembling the first substrate and the second substrate, which affects key indexes of the phase shifter, such as a phase shifting degree.

In view of at least one of the above technical problems, the following technical solutions are provided in the embodiments of the present disclosure. Before the phase shifter according to the embodiment of the present disclosure is introduced, it should be noted that the tunable dielectric layer in the embodiment of the present disclosure is the liquid crystal layer 30 for description, as an example.

Figure 3:
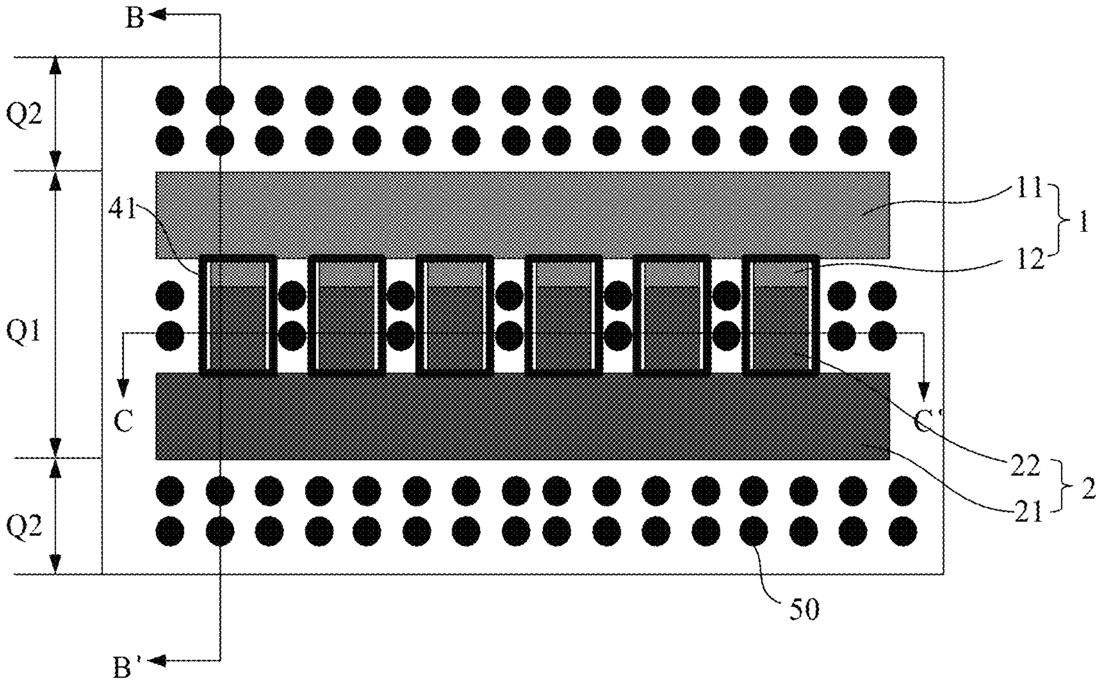
FIG. 3 is a schematic diagram of a phase shifter according to an embodiment of the present disclosure.
Figure 4:
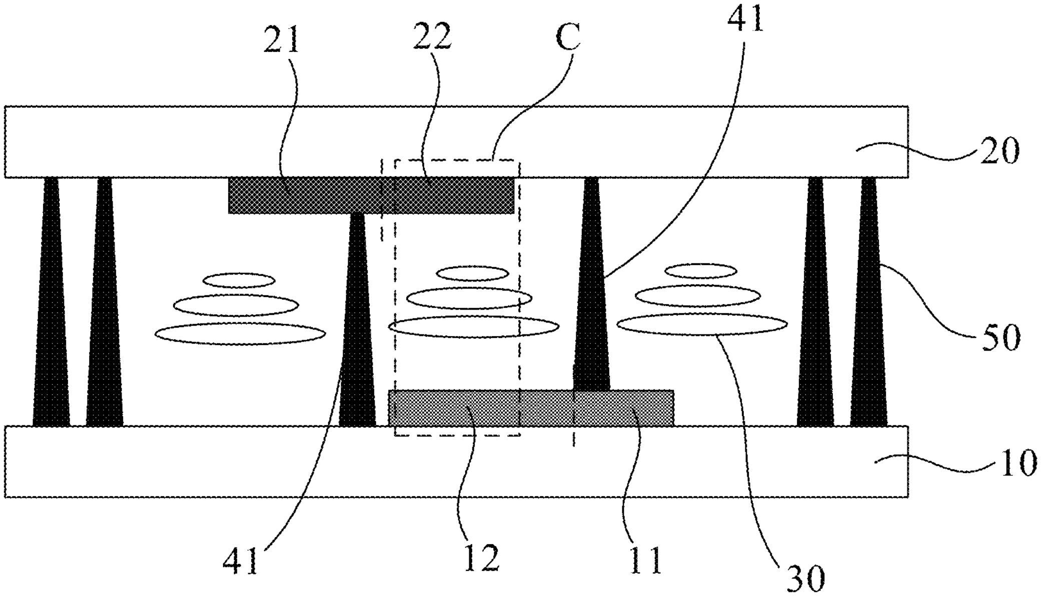
FIG. 4 is a cross-sectional view taken along a line B-B' of FIG. 3.
Figure 5:
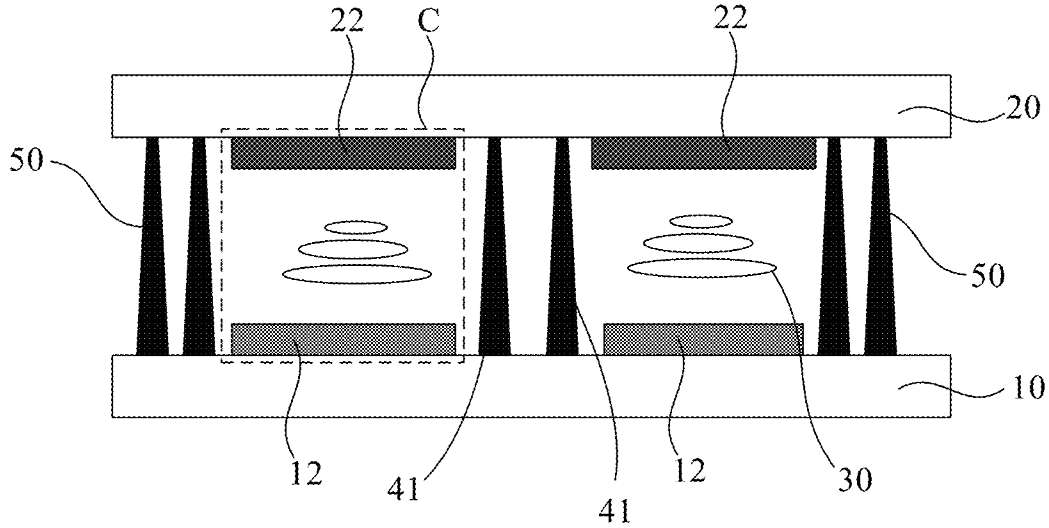
FIG. 5 is a cross-sectional view taken along a line C-C' of FIG. 3.

In a first aspect, FIG. 3 is a schematic diagram of a phase shifter according to an embodiment of the present disclosure. FIG. 4 is a cross-sectional view taken along a line B-B' of FIG. 3. FIG. 5 is a cross-sectional view taken along a line C-C' of FIG. 3. As shown in FIGS. 3 to 5, the present disclosure provides a phase shifter, which is divided into at least a phase shift region Q1 and a peripheral region Q2, wherein the phase shift region Q1 includes a plurality of overlapping regions. The phase shifter includes a first substrate and a second substrate disposed opposite to each other, and a liquid crystal layer 30 disposed between the first substrate and the second substrate. The first substrate includes a first dielectric substrate 10 and a first electrode 1 arranged on a side of the first dielectric substrate 10 close to the liquid crystal layer 30. The second substrate includes a second dielectric substrate 20 and a second electrode 2 arranged on a side of the second dielectric substrate 20 close to the liquid crystal layer 30. The first electrode 1 and the second electrode 2 are both arranged in the phase shift region Q1, and orthographic projections of the first electrode 1 and the second electrode 2 on the first dielectric substrate 10 overlap with each other in the plurality of overlapping regions, forming a plurality of overlapping capacitors C. Specifically, the phase shifter further includes a plurality of first isolation components 41 located between the first substrate and the second substrate, two end faces of each first isolation component 41 abut against the first substrate and the second substrate, respectively, and an orthographic projection of at least one overlapping capacitor C on the first dielectric substrate 10 is located within an orthographic projection of the corresponding first isolation component 41 on the first dielectric substrate 10. For example: an orthographic projection of each overlapping capacitor C on the first dielectric substrate 10 is located within an orthographic projection of the corresponding first isolation component 41 on the first dielectric substrate 10.

In the embodiment of the present disclosure, the first isolation component 41 abuts against the first substrate and the second substrate to separate the overlapping capacitors C from each other, at this time, the liquid crystal material between two plates of each overlapping capacitor C will be limited in the corresponding first isolation component 41, so that the problems can be effectively avoided that the flow and leakage of the liquid crystal material between adjacent overlapping capacitors C affect the phase shift degree and other key indexes of the phase shifter.

In one example, the first electrode 1 in the phase shifter includes a first transmission line 11 extending along a transmission direction of the microwave signal, and a plurality of first branches 12 connected to the first transmission line 11 and arranged side by side along the transmission direction of the microwave signal. The second electrode 2 includes a second transmission line 21 extending along the transmission direction of the microwave signal, and a plurality of second branches 22 connected to the second transmission line 21 and arranged side by side along the transmission direction of the microwave signal. An orthographic projection of an end of each first branch 12 away from the first transmission line 11 on the first dielectric substrate 10 and an orthographic projection of an end of the corresponding second branch 22 away from the second transmission line 21 on the first dielectric substrate 10 at least partially overlap with each other, to form a capacitor C in the overlapping region. For example: the first branches 12 are in one-to-one correspondence with the second branches 22, and orthographic projections of the first branch 12 and second branch 22 corresponding to each other on the first dielectric substrate 10 at least partially overlap with each other. In the embodiment of the present disclosure, as an example, the first branches 12 are in one-to-one correspondence with the second branches 22 for description.

It should be noted that the phase shifter may include a reference electrode located on a side of the first dielectric substrate 10 or the second dielectric substrate 20 away from the liquid crystal layer 30, the reference electrode may be a ground electrode, and orthographic projections of the first electrode 1 and the second electrode 2 on the first dielectric substrate 10 both at least partially overlap with an orthographic projection of the reference electrode on the first dielectric substrate 10, so that the first electrode 1, the second electrode 2, and the reference electrode may form a current loop. It should be understood that the phase shifter does not rely on the reference electrode for its operation, and that one or more reference electrodes may be necessary when the phase shifter is integrated in an antenna.

Further, when the phase shifter adopts the above structure, the first transmission line 11 and the second transmission line 21 may both adopt a linear structure, and both ends of the first transmission line 11 and both ends of the second transmission line 21 are aligned with each other respectively and the first transmission line 11 and the second transmission line 21 have the same line width. Alternatively, the first transmission line 11 and the second transmission line 21 may also be meandering lines, and shapes of the first transmission line 11 and the second transmission line 21 are not limited in the embodiment of the present disclosure.

Further, a length and a width of each first branch 12 are constant, and a length and a width of each second branch 22 are constant. In this case, an overlapping area of orthographic projections of each first branch 12 and the corresponding second branch 22 on the first dielectric substrate 10 is constant (an area of a region where the orthographic projections of each first branch 12 and the corresponding second branch 22 on the first dielectric substrate 10 overlap with each other is constant). In some examples, the overlapping areas of the orthographic projections of the first branches 12 and the corresponding second branches 22 on the first dielectric substrate 10 are at least partially different from each other. For example: along the transmission direction of the microwave signal, the overlapping areas of the orthographic projections of the first branches 12 and the corresponding second branches 22 on the first dielectric substrate 10 monotonically increases or decreases.

In one example, the first branches 12 have the same length and different widths, and the second branches 22 have the same length and different widths, so that overlapping areas of the orthographic projections of at least some of the first branches 12 and the corresponding second branches 22 on the first dielectric substrate 10 are different from each other. Alternatively, the first branches 12 have the same width and different lengths, and the second branches 22 have the same width and different lengths, so that overlapping areas of the orthographic projections of at least some of the first branches 12 and the corresponding second branches 22 on the first dielectric substrate 10 are different from each other. Several implementations are only listed as above but do not limit the scope of the embodiments of the present disclosure.

Further, a distance between any two adjacent first branches 12 is constant; and a distance between any two adjacent second branches 22 is constant. When the first branches 12 are in one-to-one correspondence with the second branches 22, the distance between any two adjacent first branches 12 and the distance between any two adjacent second branches 22 may be equal to each other.

In some examples, referring to FIG. 3, each first isolation component 41 and the first substrate and the second substrate define an enclosed space, and the corresponding first branch 12 and the corresponding second branch 22, whose the orthographic projections on the first dielectric substrate 10 overlap with each other, are disposed in each first isolation component 41. That is, the first isolation components 41 are in one-to-one correspondence with the overlapping capacitors C. In this case, the first isolation components 41 are arranged side by side along the transmission direction of the microwave signal, and effectively separate the liquid crystal material corresponding to the overlapping capacitors C from each other.

Figure 6:
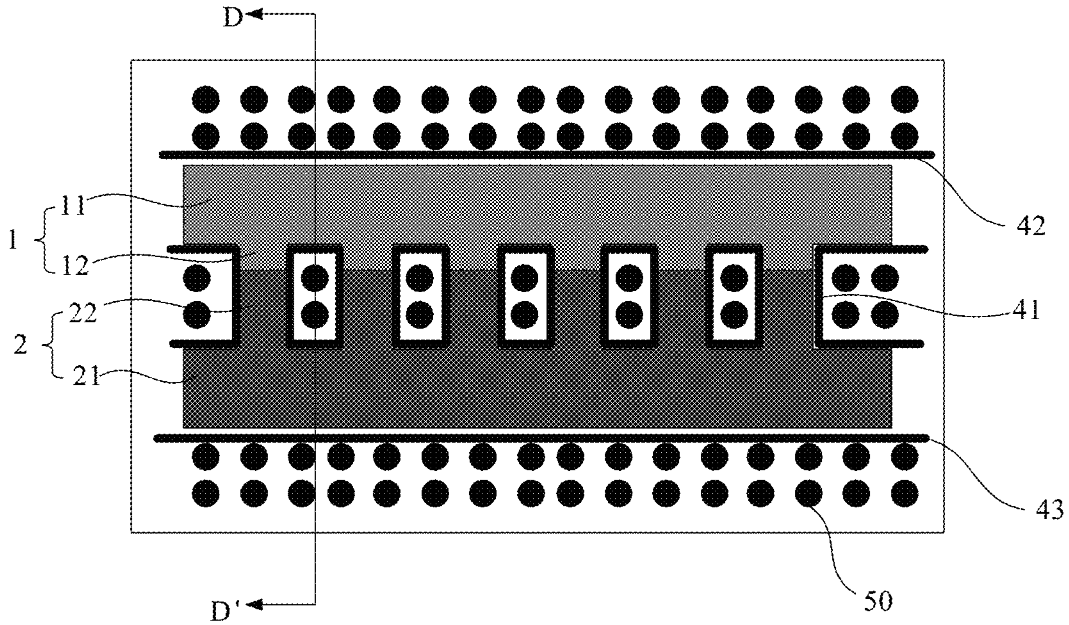
FIG. 6 is a schematic diagram of another phase shifter according to an embodiment of the present disclosure.
Figure 7:
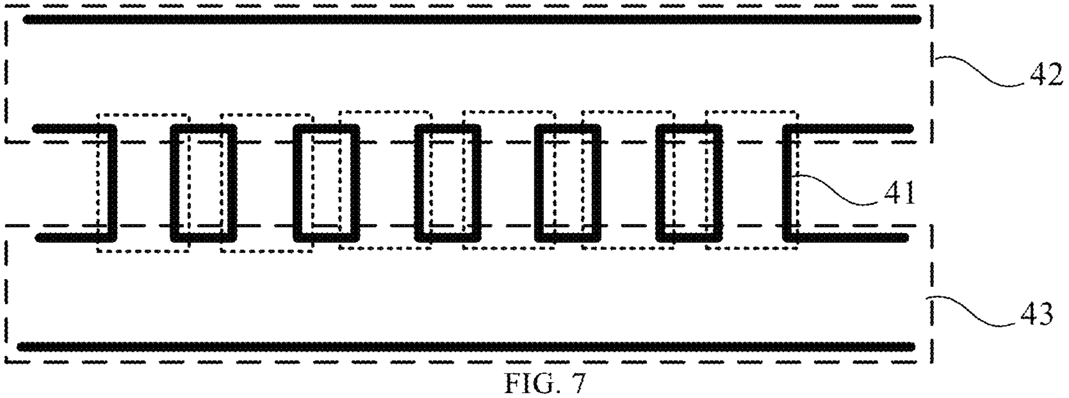
FIG. 7 is a schematic diagram of a first isolation component, a second isolation component, and a third isolation component in a phase shifter shown in FIG. 6.
Figure 8:
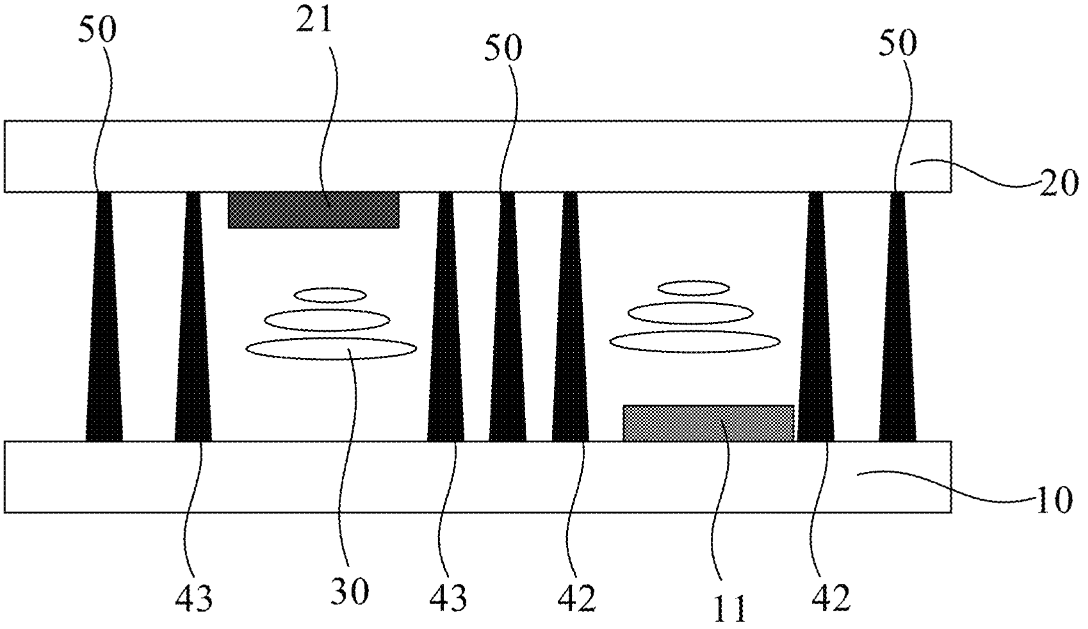
FIG. 8 is a cross-sectional view taken along a line D-D' of FIG. 6.

In some examples, FIG. 6 is a schematic diagram of another phase shifter according to an embodiment of the present disclosure. FIG. 7 is a schematic diagram of a first isolation component 41, a second isolation component 42, and a third isolation component 43 in a phase shifter shown in FIG. 6. FIG. 8 is a cross-sectional view taken along a line D-D' of FIG. 6. As shown in FIGS. 6 to 8, the phase shifter includes not only the first isolation components 41 described above, but also a second isolation components 42 and a third isolation component 43 disposed between the first substrate and the second substrate and extending along the transmission direction of the microwave signal. The first isolation components 41 are in communication with both the second isolation component 42 and the third isolation component 43. An orthographic projection of the first transmission line 11 on the first dielectric substrate 10 is positioned in an orthographic projection of the second isolation component 42 on the first dielectric substrate 10. An orthographic projection of the second transmission line 21 on the first dielectric substrate 10 is located within an orthographic projection of the third isolation component 43 on the first dielectric substrate 10. The reason for this arrangement is that, since the first electrode 1 (including the first transmission line 11 and the first branches 12) and the second electrode 2 (including the second transmission line 21 and the second branches 22) have a certain thickness, the second isolation component 42 and the third isolation component 43 are both communicated with the first isolation components 41, to form an isolation component having a one-piece structure, the first transmission line 11, the first branches 12, the second transmission line 21 and the second branches 22 are located in the isolation component, and when two end faces of the isolation component abut against the first substrate and the second substrate, respectively, positions of the first transmission line 11, the first branches 12, the second transmission line 21 and the second branches 22 are avoided, so that the two end faces of the isolation component may be respectively and completely in contact with the first substrate and the second substrate, thereby effectively separating the liquid crystal material corresponding to the overlapping capacitors C from each other.

Figure 9:
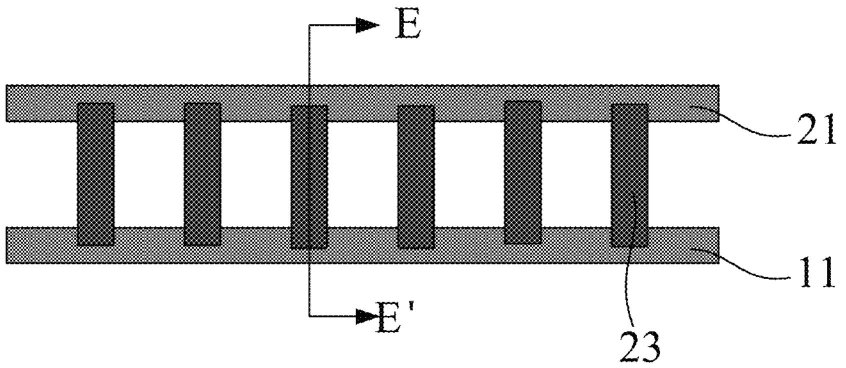
FIG. 9 is a top view of a first electrode and a second electrode of another phase shifter according to an embodiment of the present disclosure.
Figure 10:
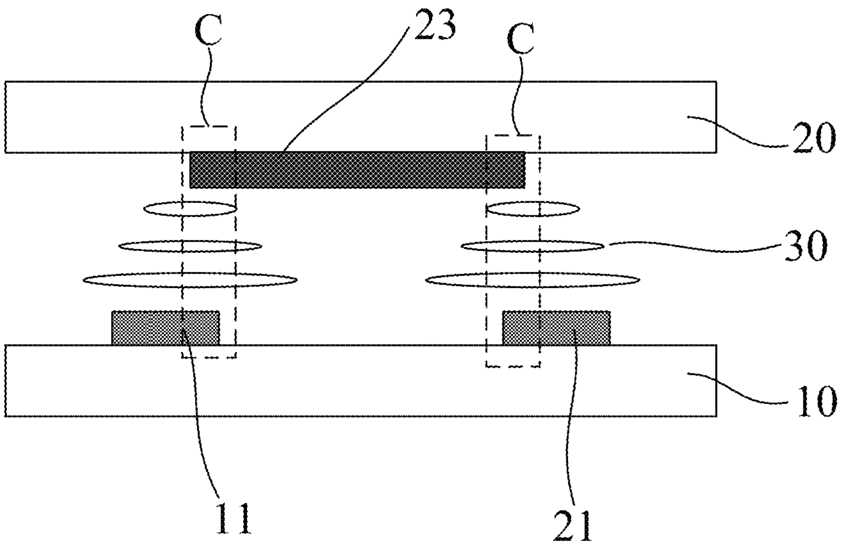
FIG. 10 is a cross-sectional view taken along a line E-E' of FIG. 9.

In another example, FIG. 9 is a top view of a first electrode 1 and a second electrode 2 of another phase shifter according to an embodiment of the present disclosure. FIG. 10 is a cross-sectional view taken along a line E-E' of FIG. 9. As shown in FIGS. 9 and 10, the first electrode 1 in the phase shifter may include a first transmission line 11 and a second transmission line 21 extending along a transmission direction of the microwave signal and arranged side by side; correspondingly, the second electrode 2 may include a plurality of patch structures 23 arranged side by side in the transmission direction of the microwave signal. Orthographic projections of two ends of each patch structure 23 on the first dielectric substrate 10 at least partially overlap with orthographic projections of the first transmission line 11 and the second transmission line 21 on the first dielectric substrate 10 respectively. That is, a plurality of overlapping capacitors C located in the overlapping regions are formed. In this case, direct current bias voltages are applied to the first transmission line 11, the second transmission line 21 and the patch structures 23, to form electric fields at least at overlapping regions between the patch structures 23 and the first transmission line 11 and the second transmission line 21, to drive the liquid crystal molecules of the liquid crystal layer 30 to rotate and to change the dielectric constant of the liquid crystal layer 30, thereby achieving the phase shift of the microwave signals transmitted by the first transmission line 11 and the second transmission line 21.

In this case, two overlapping capacitors C are provided in each first isolation component 41, and are formed by overlapping of the corresponding patch structure 23 with the first transmission line 11 and the second transmission line 21. Alternatively, in this example, the phase shifter may also include the second isolation component 42 and the third isolation component 43, and likewise, the second isolation component 42 and the third isolation component 43 may be the same as the second isolation component 42 and the third isolation component 43 in the above phase shifter, and the description thereof is not repeated here.

Further, when the phase shifter adopts the above structure, the first transmission line 11 and the second transmission line 21 may both adopt a linear structure, both ends of the first transmission line 11 and both ends of the second transmission line 21 are aligned with each other respectively and the first transmission line 11 and the second transmission line 21 have the same line width. Alternatively, the first transmission line 11 and the second transmission line 21 may also be meandering lines, and shapes of the first transmission line 11 and the second transmission line 21 are not limited in the embodiment of the present disclosure.

In some examples, the patch structures 23 may have the same structure, and an overlapping area of orthographic projections of each patch structure 23 and the first transmission line 11 on the first dielectric substrate 10 is constant; an overlapping area of orthographic projections of each patch structure 23 and the second transmission line 21 on the second dielectric substrate 20 is constant. Further, for each patch structure 23 including a first end and a second end disposed opposite to each other, an overlapping region of orthographic projections of the first end and the first transmission line 11 on the first dielectric substrate 10 is a first region, an overlapping region of orthographic projections of the second end and the second transmission line 21 on the first dielectric substrate 10 is a second region, and areas of the first region and the second region are equal to each other.

In some examples, as shown in FIG. 9, the patch structures 23 may also adopt different structures, where overlapping areas of at least part of orthographic projections of the patch structures 23 and the first transmission line 11 on the first dielectric substrate 10 are different from each other; overlapping areas of at least part of orthographic projections of the patch structures 23 and the second transmission line 21 on the second dielectric substrate 20 are different from each other. For example: for each patch structure 23, which includes a first end and a second end opposite to each other, an overlapping region of orthographic projections of the first end and the first transmission line 11 on the first dielectric substrate 10 is a first region, an overlapping region of orthographic projections of the second end and the second transmission line 21 on the first dielectric substrate 10 is a second region, and areas of the first region and the second region are equal to each other. Along the transmission direction of the microwave signal, areas of the first regions are monotonously increased or decreased, and areas of the second regions are monotonously increased or decreased. For example: the patch structures 23 have the same width and different lengths, along the transmission direction of the microwave signal, lengths of the first regions are monotonically increased or decreased; for another example: the patch structures 23 have the same length and different widths, along the transmission direction of the microwave signal, widths of the first regions are monotonically increased or decreased. Some examples are only given as above for illustrating positional relationship among the first transmission line 11, the second transmission line 21 and the patch structures 23, but do not limit the scope of the embodiments of the present disclosure. In some examples, it is also possible that for each patch structure 23, which includes a first end and a second end opposite to each other, an overlapping region of orthographic projections of the first end and the first transmission line 11 on the first dielectric substrate 10 is a first region, an overlapping region of orthographic projections of the second end and the second transmission line 21 on the first dielectric substrate 10 is a second region, and areas of the first region and the second region are not equal to each other. Other cases are not specifically enumerated here.

In some examples, a distance between any two adjacent patch structures 23 is constant. In some examples, the distances between at least some of the adjacent patch structures 23 are different from each other. For example, along the transmission direction of the microwave signal, a distance between any two adjacent of the patch structures 23 located at each of both ends is larger than that between any two adjacent of the patch structures 23 located in the middle. For another example: the distances between the adjacent patch structures 23 are monotonically increased or decreased along the transmission direction of microwave signal.

It should be noted that only the several structures of the first electrode 1 and the second electrode 2 in the phase shifter are given above, but these are merely exemplary implementations, but do not limit the scope of the embodiments of the present disclosure, as long as all implementable structures capable of implementing the phase shifting on the microwave signal are within the protection scope of the embodiment of the present disclosure.

In one example, no matter which structure is adopted by the phase shifter, the phase shifter may further include spacers 50 disposed between the first dielectric substrate 10 and the second dielectric substrate 20. The spacers 50 are disposed in the peripheral region Q2 and the phase shift region Q1 of the phase shifter to maintain a cell gap (which is an accommodation space of the liquid crystal layer 30) of the phase shifter. Since the first, second, and third isolation components 41, 42, and 43 are provided in the phase shift section Q1, and the first, second, and third isolation components 41, 42, and 43 all abut against the first and second substrates, the cell gap can be maintained. In this case, the number of spacers 50 in the phase shifter can be reduced. For example: an arrangement density of the spacers 50 in the phase shift region Q1 is designed to be smaller than that of the spacers 50 in the peripheral region Q2. The arrangement density of the spacers 50 means the number of the spacers 50 per unit area.

Further, when the spacers 50 located in the phase shift region Q1 and the peripheral region Q2 are arranged in an array, a distance between any two adjacent spacers 50 is in a range from about 500 μm to 600 μm. A radius of an orthographic projection of each spacer 50 on the first dielectric substrate 10 is in a range from about 20 μm to 30 μm.

In one example, no matter which structure is adopted by the phase shifter, the thicknesses of the first electrode 1 and the second electrode 2 may be more than 3 μm. By designing the first electrode 1 and the second electrode 2 to be thicker, resistances of the first electrode 1 and the second electrode 2 can be reduced, and the transmission loss of the microwave signal can be reduced, and the intensity of the microwave signal can be improved. Alternatively, for any phase shifter, the phase shifter may include not only the above structure, but also a first bias voltage line for providing a direct current bias voltage to the first electrode 1, a second bias voltage line for providing a direct current bias voltage to the second electrode 2, a first alignment layer disposed on a side of the first electrode 1 away from the first dielectric substrate 10, a second alignment layer disposed on a side of the second electrode 2 away from the second dielectric substrate 20, and other elements, which are not listed here.

In a second aspect, embodiments of the present disclosure provide a method for manufacturing a phase shifter, which may be used to manufacture the phase shifter in any one of the above embodiments. The manufacturing method includes: forming a first substrate and a second substrate, and aligning and assembling the first substrate and the second substrate, and forming a tunable dielectric layer therebetween in a filling way; the phase shifter includes a phase shift region Q1 and a peripheral region Q2, and the phase shift region Q1 includes a plurality of overlapping regions.

The forming the first substrate includes: providing a first dielectric substrate 10, and forming a first electrode 1 on the first dielectric substrate 10, wherein the first electrode 1 is located in the phase shift region Q1.

The forming the second substrate includes: providing a second dielectric substrate 20; forming a second electrode 2 on the second dielectric substrate 20; orthographic projections of the first electrode 1 and the second electrode 2 in each overlapping region at least partially overlap with each other, to form a plurality of overlapping capacitors C.

Specifically, the manufacturing method in the embodiment of the present disclosure further includes: forming a plurality of first isolation components 41 on the first substrate or the second substrate, wherein when the first substrate and the second substrate are aligned and assembled, two end faces of each first isolation component 41 respectively abut against the first substrate and the second substrate; an orthographic projection of each overlapping capacitor C on the first dielectric substrate 10 is located in an orthographic projection of the corresponding first isolation component 41 on the first dielectric substrate 10.

In order to make the method for manufacturing a phase shifter in the embodiments of the present disclosure clearer, the phase shifter is as shown in FIG. 6, and includes the first isolation components 41, the second isolation component 42, and the third isolation component 43, as an example, and the method for manufacturing an phase shifter in the embodiments of the present disclosure is described.

S1, forming a first substrate.

Figure 11:
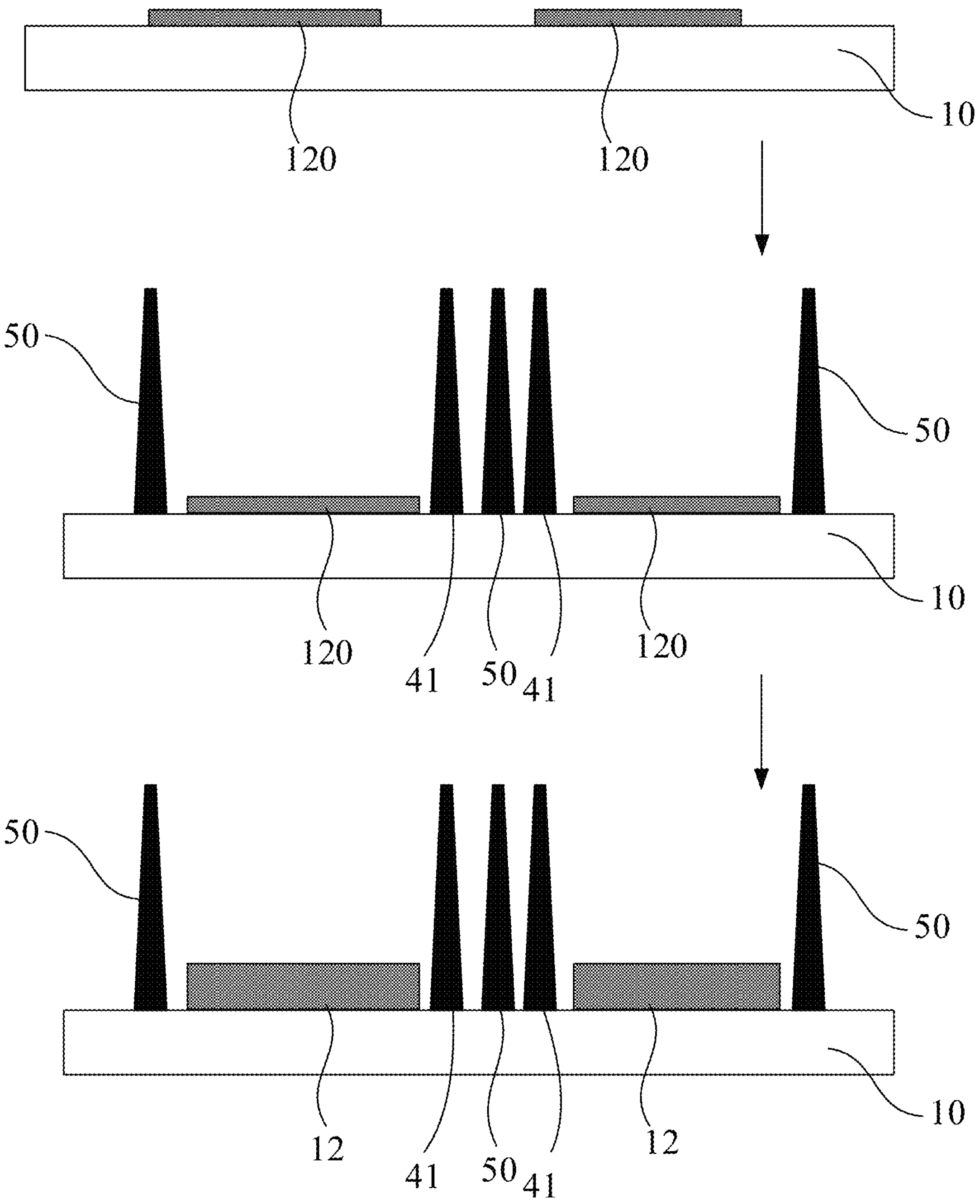
FIG. 11 is a flow chart of forming a first substrate according to an embodiment of the present disclosure.
Figure 12:
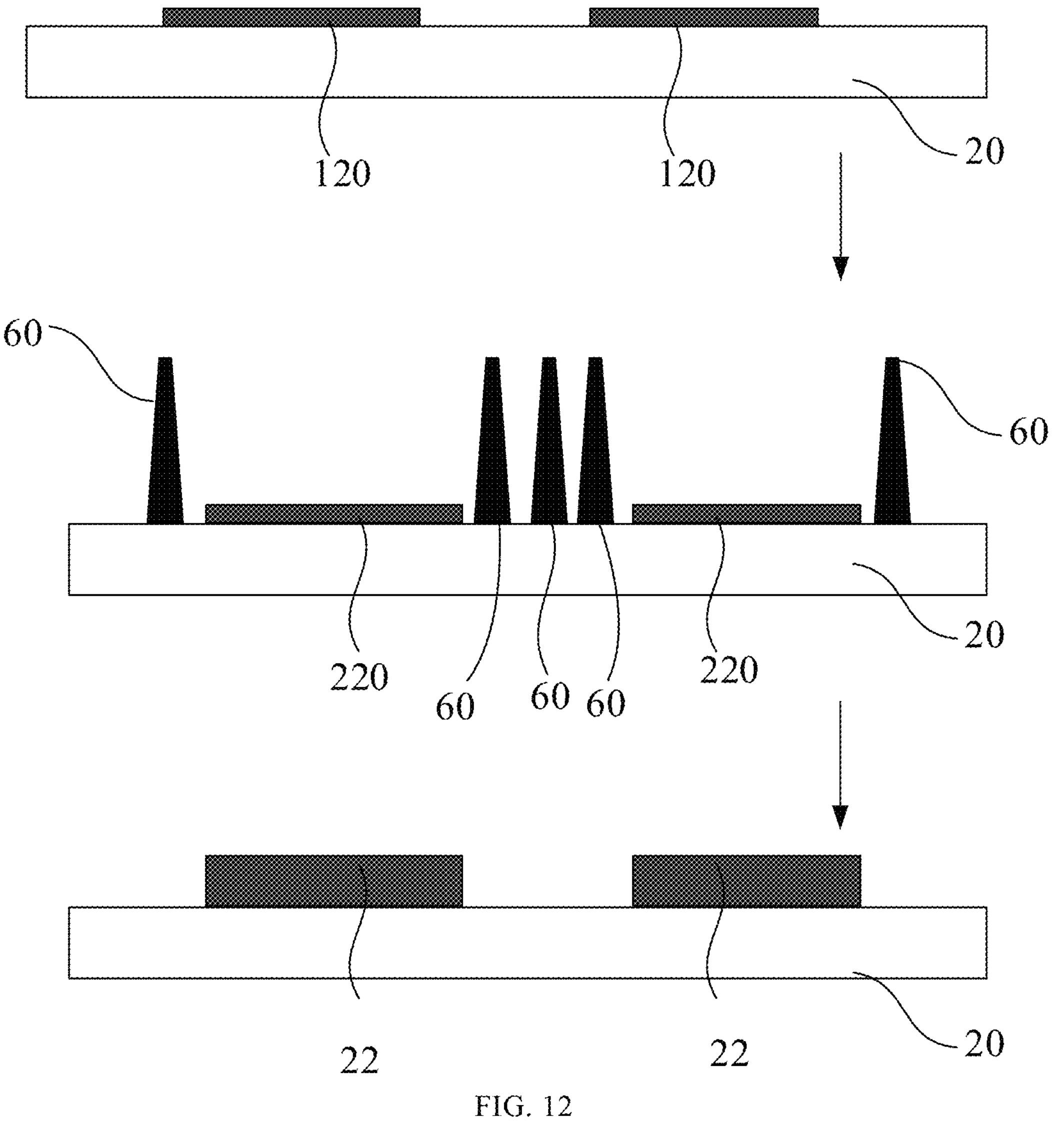
FIG. 12 is a flow chart of forming a second substrate according to an embodiment of the present disclosure.

Specifically, FIG. 11 is a flow chart of forming a first substrate according to an embodiment of the present disclosure. As shown in FIG. 11, the forming the first substrate includes:

S11, providing a first dielectric substrate 10.

The first dielectric substrate 10 includes, but is not limited to, a glass substrate.

S12, forming a pattern including a first bias signal line on the first dielectric substrate 10 by a patterning process.

A material of the first bias signal line includes, but is not limited to, indium tin oxide (ITO); the first bias signal line has a thickness in a range of about 400 Å to 700 Å.

S13, forming a first metal film on the first dielectric substrate 10 after the above steps are completed, and forming a first metal pattern through a patterning process; the first metal pattern is the same as a pattern of the first electrode 1 to be formed; and the first metal pattern is used as a first seed layer 120.

A material of the first metal film includes, but is not limited to, copper.

It should be noted that a first auxiliary metal layer may also be formed before the first metal film is formed to enhance the adhesion of the first metal film, and a material of the first auxiliary metal layer includes, but is not limited to, molybdenum.

S14, forming a first resin layer on the first dielectric substrate 10 after the above steps are completed, and forming a pattern including the first isolation components 41, the second isolation component 42, the third isolation component 43, and the spacers 50 through a patterning process. Each spacer 50 is cylindrical.

S15, electroplating the first seed layer 120, after the above steps, to form the first transmission line 11 and the first branches 12 of the first electrode 1.

S16, forming a first alignment layer on the first dielectric substrate 10 after the above steps are completed by an Inkjet process, and performing an optical alignment on the first alignment layer by an OA (optical alignment) equipment, so that uniformity of the resultant first alignment layer can be ensured.

Thus, the first substrate is formed.

The forming the second substrate includes:

S21, providing a second dielectric substrate 20.

The second dielectric substrate 20 includes, but is not limited to, a glass substrate.

S22, forming a pattern including a second bias signal line on the second dielectric substrate 20 by a patterning process.

A material of the second bias signal line includes, but is not limited to, indium tin oxide (ITO); the second bias signal line has a thickness in a range of about 400 Å to 700 Å.

S23, forming a second metal film on the second dielectric substrate 20 after the above steps are completed, and forming a second metal pattern through a patterning process; the second metal pattern is the same as a pattern of the second electrode 2 to be formed; and the second metal pattern is used as a second seed layer 220.

A material of the second metal film includes, but is not limited to, copper.

It should be noted that a second auxiliary metal layer may also be formed before the second metal film is formed to enhance the adhesion of the second metal film, and a material of the second auxiliary metal layer includes, but is not limited to, molybdenum.

S24, forming a second organic resin layer and forming a pattern including dams 60 by a patterning process on the second dielectric substrate 20 after the above steps are completed, wherein a pattern of the dams 60 is the same as the pattern of the first isolation components 41, the second isolation component 42 and the third isolation component 43, so as to ensure the appearance of the second electrode 2 formed by electroplating the second seed layer.

S25, electroplating the second seed layer 220, after the above steps, to form the second transmission line 21 and the second branches 22 of the second electrode 2 and removing the dams 60.

S26, forming a second alignment layer on the second dielectric substrate 20 after the above steps are completed by an Inkjet process, and performing an optical alignment on the second alignment layer by an OA (optical alignment) equipment, so that uniformity of the resultant second alignment layer can be ensured.

Thus, the second substrate is formed.

After the first substrate and the second substrate are formed, a liquid crystal pouring is performed on the first substrate, and then the first substrate and the second substrate are aligned and assembled to form the phase shifter.

It should be noted that the first isolation components 41, the second isolation component 42, the third isolation component 43 and the spacers 50 may also be formed on the second substrate, and the process used is the same as the process for forming the first isolation components 41, the second isolation component 42, the third isolation component 43 and the spacers 50 on the first substrate, and therefore, the description thereof is not repeated here.

In a third aspect, an embodiment of the present disclosure provides an electronic device which includes the antenna; the antenna may include the phase shifter.

The antenna provided by an embodiment of the present disclosure further includes a transceiver unit, a radio frequency transceiver, a signal amplifier, a power amplifier, and a filtering unit. The antenna 1 may be used as a transmitting antenna or a receiving antenna. The transceiver unit may include a baseband and a receiving terminal, where the baseband provides a signal in at least one frequency band, such as 2G signal, 3G signal, 4G signal, 5G signal, or the like; and transmits the signal in the at least one frequency band to the radio frequency transceiver. After the signal is received by the antenna in the electronic device and is processed by the filtering unit, the power amplifier, the signal amplifier and the radio frequency transceiver, the antenna may transmit the signal to the receiving terminal (such as an intelligent gateway or the like) in the transceiver unit.

Further, the radio frequency transceiver is connected to the transceiver unit and is configured to modulate the signals transmitted by the transceiver unit or demodulate the signals received by the antenna and then transmit the signals to the transceiver unit. Specifically, the radio frequency transceiver may include a transmitting circuit, a receiving circuit, a modulating circuit, and a demodulating circuit. After the transmitting circuit receives multiple types of signals provided by the baseband, the modulating circuit may modulate the multiple types of signals provided by the baseband, and then transmit the modulated signals to the antenna. The signals received by the antenna are transmitted to the receiving circuit of the radio frequency transceiver, and transmitted by the receiving circuit to the demodulating circuit, and demodulated by the demodulating circuit and then transmitted to the receiving terminal.

Further, the radio frequency transceiver is connected to the signal amplifier and the power amplifier, which are in turn connected to the filtering unit connected to at least one antenna. In the process of transmitting signals by the antenna, the signal amplifier is used for improving a signal-to-noise ratio of the signals output by the radio frequency transceiver and then transmitting the signals to the filtering unit; the power amplifier is used for amplifying the power of the signals output by the radio frequency transceiver and then transmitting the signals to the filtering unit; the filtering unit specifically includes a duplexer and a filtering circuit, the filtering unit combines signals output by the signal amplifier and the power amplifier and filters noise waves and then transmits the signals to the antenna, and the antenna radiates the signals. In the process of receiving signals by the antenna, the signals received by the antenna are transmitted to the filtering unit, which filters noise waves in the signals received by the antenna and then transmits the signals to the signal amplifier and the power amplifier, and the signal amplifier gains the signals received by the antenna to increase the signal-to-noise ratio of the signals; the power amplifier amplifies the power of the signals received by the antenna. The signals received by the antenna are processed by the power amplifier and the signal amplifier and then transmitted to the radio frequency transceiver, and the radio frequency transceiver transmits the signals to the transceiver unit.

In some embodiments, the signal amplifier may include various types of signal amplifiers, such as a low noise amplifier, without limitation.

In some embodiments, the electronic device provided by the embodiments of the present disclosure further includes a power management unit connected to the power amplifier and for providing the power amplifier with a voltage for amplifying the signal.

It should be understood that the above embodiments are merely exemplary embodiments adopted to explain the principles of the present disclosure, and the present disclosure is not limited thereto. It will be apparent to one of ordinary skill in the art that various changes and modifications may be made therein without departing from the spirit and scope of the present disclosure, and such changes and modifications also fall within the scope of the present disclosure.

What is claimed is:

1. A phase shifter, comprising a first substrate and a second substrate opposite to each other, and a tunable dielectric layer between the first substrate and the second substrate; wherein the first substrate comprises a first dielectric substrate and a first electrode on a side of the first dielectric substrate close to the tunable dielectric layer; the second substrate comprises a second dielectric substrate and a second electrode on a side of the second dielectric substrate close to the tunable dielectric layer;

the phase shifter comprises a phase shift region and a peripheral region; the phase shift region comprises a plurality of overlapping regions; the first electrode and the second electrode are both in the phase shift region, and orthographic projections of the first electrode and the second electrode on the first dielectric substrate at least partly overlap with each other in the plurality of overlapping regions, to form a plurality of overlapping capacitors; and the phase shifter further comprises a plurality of first isolation components between the first substrate and the second substrate, two end faces of each first isolation component are in contact with the first substrate and the second substrate, respectively, and an orthographic projection of at least one overlapping capacitor on the first dielectric substrate is within an orthographic projection of the corresponding first isolation component on the first dielectric substrate; and wherein the first electrode comprises a first transmission line and a second transmission line arranged side by side and extending along a transmission direction of a microwave signal; the second electrode comprises a plurality of patch structures arranged side by side in the transmission direction of the microwave signal; orthographic projections of two ends of any patch structure on the first dielectric substrate at least partially overlap with orthographic projections of the first transmission line and the second transmission line on the first dielectric substrate, respectively, to form the corresponding overlapping capacitors in the corresponding overlapping regions.

2. The phase shifter of claim 1, wherein a thickness of the first electrode and/or the second electrode is not less than 3 μm.

3. The phase shifter of claim 1, wherein the tunable dielectric layer comprises a liquid crystal layer.

4. The phase shifter of claim 1, further comprising a second isolation component and a third isolation component between the first substrate and the second substrate and extending along the transmission direction of the microwave signal; wherein the first isolation components are in communication with both the second isolation component and the third isolation component; and an orthographic projection of the first transmission line on the first dielectric substrate is in an orthographic projection of the second isolation component on the first dielectric substrate; and an orthographic projection of the second transmission line on the first dielectric substrate is within an orthographic projection of the third isolation component on the first dielectric substrate.

5. An electronic device, comprising the phase shifter of claim 1.

6. The phase shifter of claim 1, further comprising spacers between the first substrate and the second substrate; wherein the spacers are in the peripheral region and the phase shift region.

7. The phase shifter of claim 6, wherein the first isolation components are made of a same material as the spacers.

8. A method of manufacturing the phase shifter of claim 1, comprising: forming the first substrate and the second substrate, aligning and assembling the first substrate and the second substrate, and filling the tunable dielectric material between the first substrate and the second substrate; wherein the phase shifter comprises the phase shift region and the peripheral region, and the phase shift region comprises the plurality of overlapping regions;

the forming the first substrate comprises:

providing the first dielectric substrate, and forming the first electrode on the first dielectric substrate, wherein the first electrode is in the phase shift region;

the forming the second substrate comprises:

providing the second dielectric substrate; and forming the second electrode on the second dielectric substrate; wherein orthographic projections of the first electrode and the second electrode in the plurality of overlapping regions at least partially overlap with each other, to form the plurality of overlapping capacitors; and the method further comprises:

forming the plurality of first isolation components on the first substrate or the second substrate, wherein when the first substrate and the second substrate are aligned and assembled, the two end faces of each first isolation component abut against the first substrate and the second substrate, respectively; an orthographic projection of each overlapping capacitor on the first dielectric substrate is located in an orthographic projection of the corresponding first isolation component on the first dielectric substrate.

9. The method of claim 8, wherein the forming the second electrode on the second dielectric substrate, comprises:

forming a second metal film on the second dielectric substrate, and forming a second metal pattern as a second seed layer through a patterning process; and electroplating the second seed layer, and forming a pattern comprising the second electrode through a patterning process.

10. The method of claim 8, wherein the forming the first electrode on the first dielectric substrate, comprises:

forming a first metal film on the first dielectric substrate, and forming a first metal pattern as a first seed layer through a patterning process; and electroplating the first seed layer, and forming a pattern comprising the first electrode through a patterning process.

11. The method of claim 10, wherein the plurality of first isolation components are formed on the second substrate, and the plurality of first isolation components are formed after the forming the second seed layer and before the electroplating the second seed layer.

12. The method of claim 10, wherein the plurality of first isolation components are formed on the first substrate, and the plurality of first isolation components are formed after the forming the first seed layer and before the electroplating the first seed layer.

13. A phase shifter, comprising a first substrate and a second substrate opposite to each other, and a tunable dielectric layer between the first substrate and the second substrate; wherein the first substrate comprises a first dielectric substrate and a first electrode on a side of the first dielectric substrate close to the tunable dielectric layer; the second substrate comprises a second dielectric substrate and a second electrode on a side of the second dielectric substrate close to the tunable dielectric layer;

the phase shifter comprises a phase shift region and a peripheral region; the phase shift region comprises a plurality of overlapping regions; the first electrode and the second electrode are both in the phase shift region, and orthographic projections of the first electrode and the second electrode on the first dielectric substrate at least partly overlap with each other in the plurality of overlapping regions, to form a plurality of overlapping capacitors; and the phase shifter further comprises a plurality of first isolation components between the first substrate and the second substrate, two end faces of each first isolation component are in contact with the first substrate and the second substrate, respectively, and an orthographic projection of at least one overlapping capacitor on the first dielectric substrate is within an orthographic projection of the corresponding first isolation component on the first dielectric substrate, wherein the first electrode comprises a first transmission line extending along a transmission direction of the microwave signal, and a plurality of first branches connected to the first transmission line and arranged side by side along the transmission direction of the microwave signal; the second electrode comprises a second transmission line extending along the transmission direction of the microwave signal, and a plurality of second branches connected to the second transmission line and arranged side by side along the transmission direction of the microwave signal; an orthographic projection of an end of each first branch away from the first transmission line on the first dielectric substrate and an orthographic projection of an end of the corresponding second branch away from the second transmission line on the first dielectric substrate at least partially overlap with each other, to form the corresponding overlapping capacitor in the corresponding overlapping region.

14. The phase shifter of claim 13, further comprising spacers between the first substrate and the second substrate; wherein the spacers are in the peripheral region and the phase shift region.

15. The phase shifter of claim 14, wherein the first isolation components are made of a same material as the spacers.

16. The phase shifter of claim 13, further comprising a second isolation component and a third isolation component between the first substrate and the second substrate and extending along the transmission direction of the microwave signal; wherein the first isolation components are in communication with both the second isolation component and the third isolation component; and an orthographic projection of the first transmission line on the first dielectric substrate is in an orthographic projection of the second isolation component on the first dielectric substrate; and an orthographic projection of the second transmission line on the first dielectric substrate is within an orthographic projection of the third isolation component on the first dielectric substrate.

17. The phase shifter of claim 13, wherein a thickness of the first electrode and/or the second electrode is not less than 3 μm.

18. A phase shifter, comprising a first substrate and a second substrate opposite to each other, and a tunable dielectric layer between the first substrate and the second substrate; wherein the first substrate comprises a first dielectric substrate and a first electrode on a side of the first dielectric substrate close to the tunable dielectric layer; the second substrate comprises a second dielectric substrate and a second electrode on a side of the second dielectric substrate close to the tunable dielectric layer;

the phase shifter comprises a phase shift region and a peripheral region; the phase shift region comprises a plurality of overlapping regions; the first electrode and the second electrode are both in the phase shift region, and orthographic projections of the first electrode and the second electrode on the first dielectric substrate at least partly overlap with each other in the plurality of overlapping regions, to form a plurality of overlapping capacitors; and the phase shifter further comprises a plurality of first isolation components between the first substrate and the second substrate, two end faces of each first isolation component are in contact with the first substrate and the second substrate, respectively, and an orthographic projection of at least one overlapping capacitor on the first dielectric substrate is within an orthographic projection of the corresponding first isolation component on the first dielectric substrate, wherein the phase shifter further comprises spacers between the first substrate and the second substrate; wherein the spacers are in the peripheral region and the phase shift region.

19. The phase shifter of claim 18, wherein the first isolation components are made of a same material as the spacers.

20. The phase shifter of claim 18, wherein a density of the spacers arranged in the peripheral region is greater than that of the spacers arranged in the phase shift region.

* * * * *